United States Patent [19]
Kirchweger et al.

[11] 4,174,574
[45] Nov. 20, 1979

[54] ENGINE OIL LEVEL MEASUREMENT DEVICE FOR SOUND PROOF ENCAPSULATED INTERNAL COMBUSTION ENGINES

[75] Inventors: Karl Kirchweger; Josef Roschmann, both of Graz, Austria

[73] Assignee: Hans List, Graz, Austria

[21] Appl. No.: 897,842

[22] Filed: Apr. 19, 1978

[30] Foreign Application Priority Data

Apr. 28, 1977 [AT] Austria .................. 3043/77

[51] Int. Cl.² ........................... G01F 23/04
[52] U.S. Cl. ....................... 33/126.7 R; 181/204
[58] Field of Search ............ 33/126.7 R; 123/198 E, 123/195 C; 181/204; 184/1 C

[56] References Cited

U.S. PATENT DOCUMENTS

| 1,658,774 | 2/1928 | Taub | 33/126.7 R |
| 3,684,053 | 5/1972 | Fachbach et al. | 181/204 |
| 3,924,597 | 12/1975 | Hatz et al. | 123/198 E |
| 3,949,727 | 4/1976 | Thien et al. | 123/198 E |
| 4,085,815 | 4/1978 | Miller | 123/198 E X |

FOREIGN PATENT DOCUMENTS

| 961319 | 3/1957 | Fed. Rep. of Germany | 33/126.7 R |
| 2547177 | 5/1977 | Fed. Rep. of Germany | 33/126.7 R |

Primary Examiner—Charles E. Phillips
Attorney, Agent, or Firm—Watson, Cole, Grindle & Watson

[57] ABSTRACT

A device for the measurement of the engine oil level in sound proof encapsulated internal combustion engines by means of an oil dipstick.

5 Claims, 3 Drawing Figures

ENGINE OIL LEVEL MEASUREMENT DEVICE FOR SOUND PROOF ENCAPSULATED INTERNAL COMBUSTION ENGINES

BACKGROUND OF THE INVENTION

This invention relates to a device for the measurement of the engine oil level in sound encapsulated internal combustion engines by means of an oil dipstick.

DESCRIPTION OF THE PRIOR ART

In conventional internal combustion engines it is common practice to insert an oil dipstick through a guide tube at the engine and to provide the outer end of the dipstick with a handle, a seal, and a detent. An oil dipstick of this kind is known for instance from German Patent 1 601 382. In the dipstick described in this patent a cap closing the oil filling pipe is provided and the arrangement is thought to be applied especially to heavy trucks. The closing cap is designed so as to prevent the cap with the dipstick from loosening when driving on rough roads and to avoid the entrance of dust and mud into the crankcase of the engine. The use of this known construction of a dipstick in sound proof encapsulated combustion engines so as to enable operation of the dipstick in safety and comfort from outside of the encapsulation makes it necessary that the guide tube must penetrate the encapsulation. However, it is difficult to gain leakproof mounting with such an arrangement due to the relative movement of the encapsulation against the engine.

In German Patent 2 159 158, a solution for the passing of an oil dipstick through the encapsulation of an encapsulated combustion engine is described. On the crankcase, a protruding part is moulded on which penetrates the encapsulation. Between the partition of the encapsulation and the protruding part, an elastic seal member is provided to compensate for the relative movement of the encapsulation. The bore to receive the oil dipstick is arranged in said protruding part. In this construction for an encapsulated combustion engine body resonance is transmitted to the surrounding air by the protruding mould part, especially with very low noise level engines. The passing of body resonance stimulated parts of the engine crankcase through the encapsulation therefore diminishes the attainable sound insulation.

SUMMARY OF THE INVENTION

It is an object of the present invention to design a device for the measurement of the engine oil level which is capable of the above described disadvantage in a simple manner. According to the invention, the guide tube for an oil dipstick comprises two coaxially and successively arranged parts, the inner of which being secured to the engine and the outer penetrating the encapsulation and being fixed thereto. The two parts of the guide tube are connected with each other in an elastic and leakproof manner, preferably by means of a creased bellow of oil resistant rubber. Thus the mounting of the guide tube parts on the engine and the encapsulation respectively can be accomplished without any problems and the relative movement between the encapsulation and the engine do not cause further disadvantages because of the elastic and leakproof connection of the two guide tube parts. However, in this embodiment, a certain drawback exists inasmuch as the relative movement of the encapsulation against the engine and the mounting tolerances of the encapsulation cause, at least in some cases, a disadvantageous diminution of measurement accuracy.

For this reason, according to another embodiment of the invention, a device is provided in which the inner part of the guide tube secured to the engine has a smaller diameter than the outer part fixed at the encapsulation, the diameter of said inner part enlarging in the range of the connection of both parts to approximately to the diameter of the outer part fixed in the encapsulation, said enlarged diameter of the inner part forming a seat for the detent of the oil dipstick. In this embodiment measurement accuracy is not influenced by the relative movement of the encapsulation against the engine.

According to a further embodiment of the invention, the oil dipstick is provided with a thicker range or a shoulder serving as a detent which rests against the seat formed within the inner part of the guide tube and, at the exit of the oil dipstick from the tube part fixed in the encapsulation, a per se known sealing element is provided which is fitted to the dipstick and seals with its periphery against the second part of the guide tube. Thus an advantageous seal at the outer end of the guide tube is attained without an undesired axial stopping of the dipstick by the outer sealing element.

DESCRIPTION OF THE DRAWINGS

The invention is hereinafter more specifically described with reference to the drawings, wherein.

DESCRIPTION OF THE PREFERRED EMBODIMENTS

Figure 1:
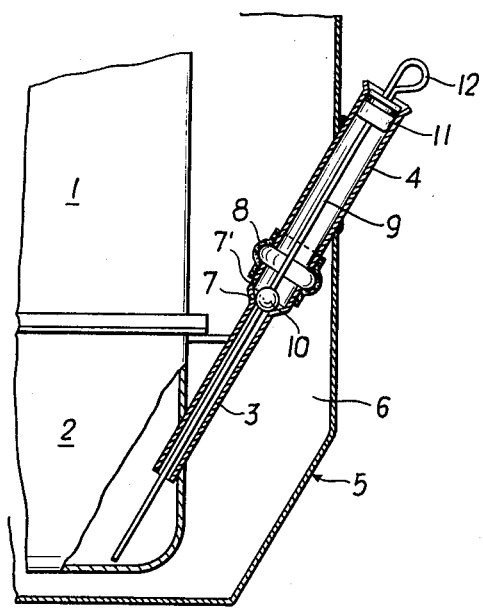
FIG. 1 is one embodiment device according to the invention in longitudinal section, FIG. 2 another embodiment, and FIG. 3 a further embodiment.

A guide tube 3 is fitted to the oil pan 2 of the engine 1 and secured thereto. A second guide tube 4 with a larger diameter is fixed in the encapsulation 5 of the engine 1 in a manner such that the inner end of the tube 4 lies in the space 6 between the engine 1 and the encapsulation 5. In the vicinity of the inner end of guide tube 4, guide tube 3 has a conical enlargement 7 up to the diameter of the outer tube 4 followed by a cylindrical extension 7'. Guide tube 3 and guide tube 4 are connected with each other by means of a creased bellow 8 which preferably consists of oil resistant rubber and permits relative movement between the outer guide tube 4 and the inner guide tube 3 due to its elasticity.

In the midrange of the oil dipstick 9, a pressed on spherical detent 10 is provided which rests against the conical enlargement 7. In its detent position, the oil dipstick 9 reaches nearly down to the bottom of the oil pan 2. At the outer end of the oil dipstick 9, a piston-like sealing member 11 is provided which enters the outer guide tube 4 shortly before the oil dipstick 9 is in its detent position. Sealing can be made here by means of a washer or a collar. The handle of the dipstick immediately following the sealing member 11 is indicated by 12.

Figure 2:
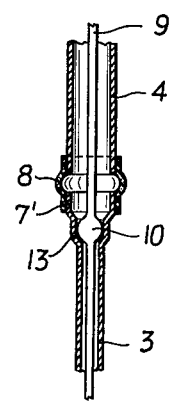

At the embodiment according to FIG. 2, the spherical detent 10 consists of an enlarged portion of the dipstick 9 itself. In the detent position of the dipstick 9, detent 10 is located within a cylindrical enlargement 13 of the inner guide tube 3, the cylindrical enlargement being further widened to the cylindrical extension 7'.

Figure 3:
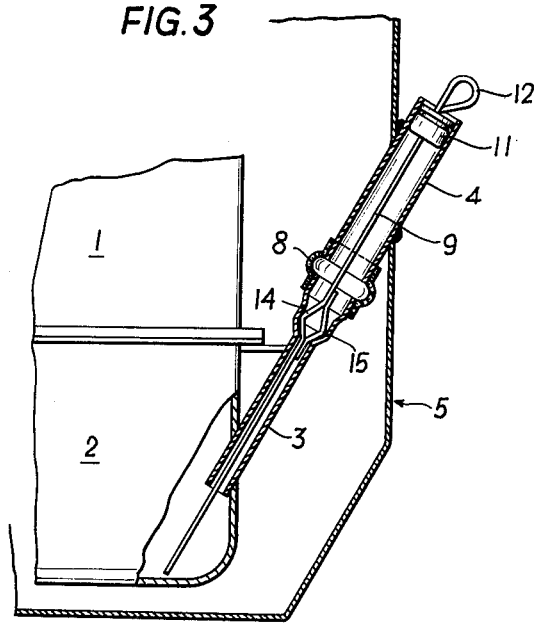

The embodiment according to FIG. 3 differs from that according to FIG. 2 only in that the detent of the oil dipstick 9 is formed by a kink 14 provided in the dipstick, and a counter piece 15 which is approximately symmetrical with respect to the axis of the dipstick and is attached on the dipstick 9. Sealing of the oil dipstick at the outer end of the guide tube 4 again is made by the sealing member 11.

We claim:

1. A device for the measurement of the engine oil level in sound proof encapsulated internal combustion engines by means of an oil dipstick, said device comprising an oil dipstick, and a dipstick guide tube comprising two coaxially and successively arranged guide tube parts, the inner of said two guide tube parts adapted to be secured to the engine and the outer guide tube part adapted to penetrate the encapsulation and be fixed thereto, said two guide tube parts being elastically and leakproof connected with each other by sealing means, and the inner guide tube part of the guide tube having a smaller diameter than the outer guide tube part, said inner guide tube part enlarging in diameter in the range of the connection of both guide tube parts to approximately the diameter of the outer guide tube part, said enlarged diameter of the inner guide tube forming a seat for a detent on the oil dipstick.

2. A device according to claim 1 wherein the sealing means is a creased bellow of oil resistant rubber.

3. A device for the measurement of the engine oil level in sound proof encapsulated internal combustion engines by means of an oil dipstick, said device comprising an oil dipstick, and a dipstick guide tube comprising two coaxially and successively arranged guide tube parts, the inner of said two guide tube parts adapted to be secured to the engine and the outer guide tube part adapted to penetrate the encapsulation and be fixed thereto, said two guide tube parts being elastically and leakproof connected with each other by sealing means, the oil dipstick having a thicker range or a shoulder serving as a detent, said detent capable of resting against a seat formed within the inner guide tube part of the guide tube and the end of the oil dipstick adjacent to the exist of the outer guide tube part includes a sealing element fitted to the dipstick and capable of sealing with its periphery against the outer guide tube part of the guide tube.

4. A device according to claim 3 wherein the sealing means is a creased bellow of oil resistant rubber.

5. A device according to claim 3, wherein the inner guide tube part of the guide tube has a smaller diameter than the outer guide tube part, said inner guide tube part enlarging in diameter in the range of the connection of both guide tube parts to approximately the diameter of the outer guide tube part, said enlarged diameter forming the seat for the detent on the oil dipstick.

* * * * *